United States Patent
Joos et al.

(10) Patent No.: US 6,752,118 B2
(45) Date of Patent: Jun. 22, 2004

(54) VALVE-CONTROLLED INTERNAL COMBUSTION ENGINE

(75) Inventors: Klaus Joos, Freiberg (DE); Janusz Kwiatowski, Stuttgart (DE)

(73) Assignee: Daimler Chrysler A.G., Stuttgart (DE)

( * ) Notice: Subject to any disclaimer, the term of this patent is extended or adjusted under 35 U.S.C. 154(b) by 0 days.

(21) Appl. No.: 10/401,192

(22) Filed: Mar. 27, 2003

(65) Prior Publication Data

US 2003/0192502 A1 Oct. 16, 2003

(30) Foreign Application Priority Data

Apr. 11, 2002 (DE) .......................................... 102 15 914

(51) Int. Cl.[7] .................................................. F02F 1/00
(52) U.S. Cl. .................................................. 123/193.5
(58) Field of Search .......................... 60/289, 290, 291, 60/292, 293, 274, 278, 284, 304; 129/193.5

(56) References Cited

U.S. PATENT DOCUMENTS 3,468,124 A 9/1969 Hraboweckyj
4,103,488 A 8/1978 Aoyama
5,435,129 A * 7/1995 Hosoya et al. ................ 60/284
5,822,976 A * 10/1998 Cockerill ...................... 60/274
6,085,519 A * 7/2000 Prior et al. ................... 60/304
6,625,974 B1 * 9/2003 Herynek ....................... 60/278

FOREIGN PATENT DOCUMENTS

DE  2 033 794     1/1972
DE  295 15 054    1/1996

* cited by examiner

*Primary Examiner*—Marguerite McMahon
(74) *Attorney, Agent, or Firm*—Klaus J. Bach

(57) ABSTRACT

In a valve-controlled internal combustion engine having a cylinderhead with an exhaust gas passage extending from a combustion chamber and a secondary air duct for supplying secondary air to the exhaust gas passage downstream of an exhaust valve opening, the exhaust gas passage includes a projection just downstream of the exhaust valve opening, which projection extends in the direction of flow of the exhaust gases and forms, with the exhaust passage wall, a pocket which is open towards the exhaust passage and into which the secondary air passage opens for supplying secondary air to the exhaust gas.

3 Claims, 1 Drawing Sheet

US 6,752,118 B2

VALVE-CONTROLLED INTERNAL COMBUSTION ENGINE

BACKGROUND OF THE INVENTION

The invention relates to a valve-controlled internal combustion engine including a cylinderhead with an outlet passage joined by a secondary air supply passage for supplying fresh air to the exhaust gas discharged from the engine through the outlet passage.

In order to reduce the emission of pollutants from internal combustion engines, it is known to feed secondary air to the exhaust gas system in order to burn carbon monoxide and hydrocarbon components of the exhaust gases in a thermal reactor or catalytic converter. U.S. Pat. No. 4,103,488 discloses a valve-controlled internal combustion engine in which secondary air is fed into an exhaust duct through a nozzle just downstream of an exhaust valve. A control valve is provided in the air supply line, which control valve is closed when the exhaust gas pressure is higher than the pressure in the air supply line and opens when the pressure in the exhaust gas duct drops. As a result, the air can flow out of the secondary air nozzle essentially only when the exhaust valve is closed. This considerably reduces the effectiveness of introducing secondary air into the exhaust gas.

German laid-open application DE-A 2 033 794 A discloses a method for detoxifying exhaust gases in spark ignition engines by post-combustion of the exhaust gases outside the engine. The exhaust gases are expanded in a swirl generator with adjacent diffuser and the combustion air is sucked in by the vacuum produced in the process. The post combustion takes place in the diffuser in which the pressure rises again. Such a method can be carried out only with increased structural expenditure.

DE 295 15 054 U1 discloses an exhaust gas detoxification system for internal spark ignition combustion engines on the basis of catalytic post-combustion in which a Venturi nozzle is arranged in such a way that the partial vacuum produced by an exhaust gas flow in the Venturi nozzle is used to introduce air into the stream of exhaust gas. In addition, it is proposed to integrate one or more non-return valves into the air feed line. However, an increased structural expenditure is also necessary for this solution.

It is the object of the invention to improve the feeding of secondary air into the engine exhaust duct by simple, inexpensive means.

SUMMARY OF THE INVENTION

In a valve-controlled internal combustion engine having a cylinderhead with an exhaust gas passage extending from a combustion chamber and a secondary air duct for supplying secondary air to the exhaust gas passage downstream of an exhaust valve opening, the exhaust gas passage includes a projection just downstream of the exhaust valve opening, which projection extends in the direction of flow of the exhaust gases and forms, with the exhaust passage wall, a pocket which is open towards the exhaust passage and into which the secondary air passage opens for supplying secondary air to the exhaust gas.

As the exhaust gas flows past the opening of the pocket at a high speed the secondary air is entrained into the stream of exhaust gas whereby the air is mixed intensively with the exhaust gases. Post-combustion reactions, which are finally completed in the exhaust gas catalytic converter thus occur even on the way to the catalytic converter.

The pocket is preferably funnel-shaped by virtue of the fact that the pocket widens at an acute angle $\alpha$ in the form of a funnel towards the exhaust gas passage in a first plane including the axis of the exhaust gas passage. Preferably, the pocket widens toward the exhaust passage at an acute angle $\beta$ in a second plane normal to the first plane to form a discharge funnel. This increases the pressure of the secondary air towards the exhaust passage, as a result of which the secondary air can relatively easily be mixed into the exhaust gases flowing in the exhaust gas passage.

Further advantages will become apparent from the description of the invention on the basis of the drawings. An exemplary embodiment of the invention will be described with reference to the drawings.

DETAILED DESCRIPTION OF AN EMBODIMENT OF THE INVENTION

Figure 1:
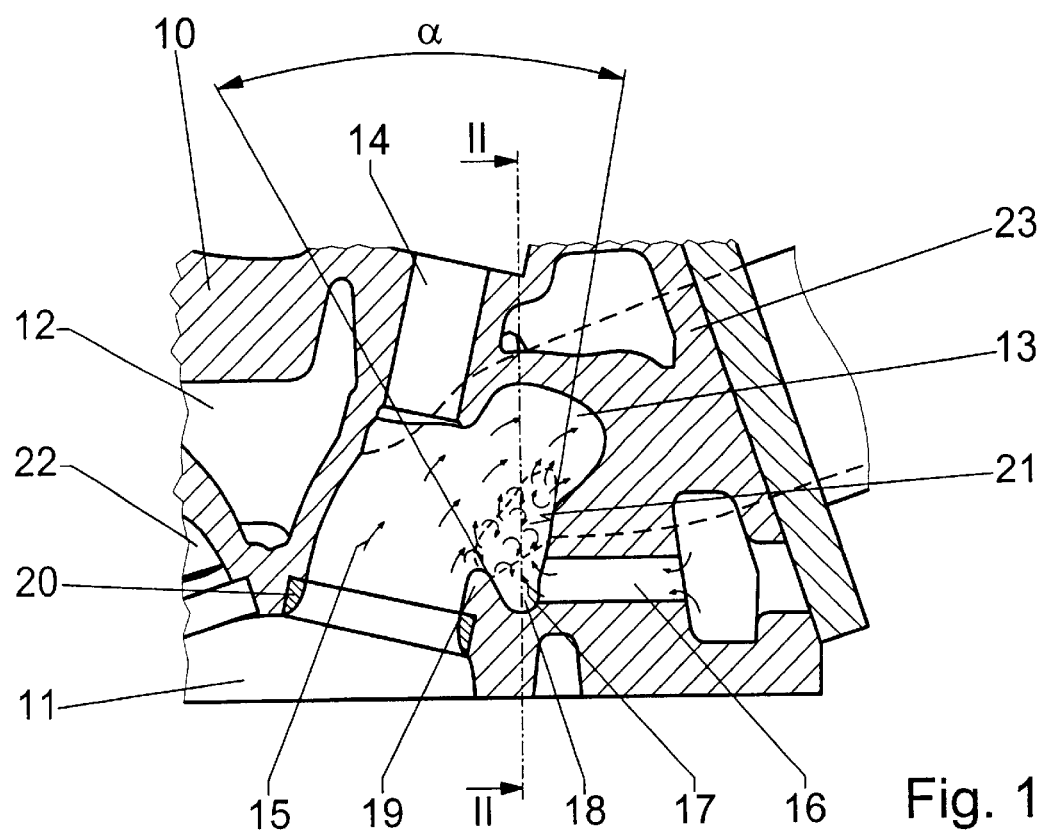
FIG. 1 is a schematic partial longitudinal sectional view through a cylinder head of an internal combustion engine taken along the line I—I of FIG. 2.
Figure 2:
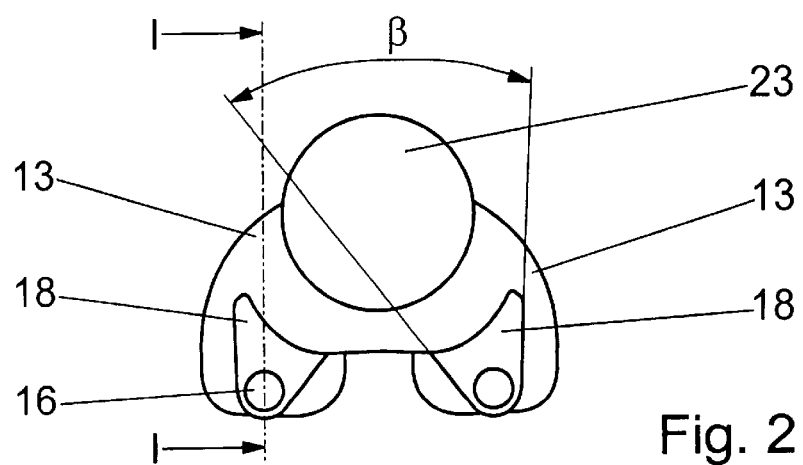
FIG. 2 shows a partial transverse section through an exhaust passage taken along line II—II of FIG. 1.

A cylinder head 10 closes a combustion chamber 11 of a reciprocating piston internal combustion engine (not illustrated in more detail) in the upward direction. It has four charge cycle valves which are not shown and which are guided in valve guides 14. Two of the valves are intake valves which control the gas flow through the inlet passages 22 and two of the valves are exhaust valves, which control the exhaust gas flow through the exhaust passages 13. The two exhaust passages 13 join to form a common exhaust gas collecting duct 23. Each valve opening includes a valve seat ring 20, against which a valve plate of a charge cycle valve bears in the closed state. The exhaust valve seat ring 20 shown is installed into the cylinder head 10 at the point where the exhaust passage 13 joins the combustion chamber 11. The charge cycle passages 13, 22 are surrounded by coolant spaces 12.

When the exhaust valve is opened, the exhaust gases flow out of the internal combustion chamber 11 into the exhaust passage 13 and from there into the exhaust collecting duct 23. The arrows 15 indicate the exhaust gas flow. A projection 19 is provided on one side just behind the valve seat ring 20, which projection extends in the direction of flow towards the exhaust gas-collecting duct 23. The projection 19 forms with a exhaust gas passage wall 21 a pocket 18.

A secondary air duct 16 extends to the pocket 18 and joins the pocket 18 at the base of thereof. The secondary air flow is designated by arrows 17.

The pocket 18 widens towards the exhaust passage 13 in the form of a funnel, specifically at an acute angle $\alpha$ in a first plane in the longitudinal direction of the secondary air passage 16, that is in a plane as defined by the axes of the secondary air passage 16 and the exhaust passage 13 and at an acute angle $\beta$ in a second plane extending transversely with respect to the first plane. The secondary airflow 17 is entrained by the exhaust gas flow 15 at the junction between the pocket 18 and the exhaust passage 13 and mixes with the exhaust gases. As a result of the measure according to the invention, secondary air can be introduced into the exhaust passage 13 even during the opening of the respective exhaust valve thereby drawing a relatively large secondary air flow into the exhaust gas. Because of the relatively large quantity of secondary air and thorough mixing of the exhaust gases with the secondary air, the thermal post-combustion is significantly improved and the emission of pollutants from the engine is correspondingly reduced.

What is claimed is:

1. A valve-controlled internal combustion engine having a cylinderhead including a combustion chamber and an exhaust passage extending from an outlet opening of the combustion chamber to an exhaust duct, a secondary air passage leading to said exhaust passage downstream of said outlet opening in the direction of flow of the exhaust gases, said exhaust passage having a projection just downstream of said outlet opening, said projection extending in the direction of flow of the exhaust gases and forming, in the exhaust passage wall, a pocket, which widens towards the exhaust passage and into which said secondary air passage opens for supplying air to said pocket, said pocket being so arranged that exhaust gas enters said pocket and generates turbulence in said pocket for intense mixing of said exhaust gas with the air supplied to said pocket.

2. An internal combustion engine according to claim 1, wherein said pocket widens towards the exhaust passage at an acute angle ($\alpha$) in a first plane as defined by the axes of the secondary air passage and the exhaust passage.

3. An internal combustion engine according to claim 2, wherein the pocket widens at an acute angle ($\beta$) from the mouth of the secondary air passage (16) towards the exhaust passage in a second plane extending transversely with respect to said first plane so as to form a funnel extending toward the exhaust passage.

* * * * *